(12) United States Patent
Gracieux

(10) Patent No.: US 8,356,096 B2
(45) Date of Patent: Jan. 15, 2013

(54) APPARATUSES, METHOD AND SYSTEM FOR NETWORK PERFORMANCE METRIC STATISTICS FROM TRAFFIC LINK DATA, IDENTIFYING, VIOLATING NETWORK ELEMENTS ASSOCIATED WITH THRESHOLD VIOLATION USING VISUAL CUE

(75) Inventor: Marc Evens Gracieux, Cary, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 144 days.

(21) Appl. No.: 12/789,825

(22) Filed: May 28, 2010

(65) Prior Publication Data

US 2011/0295890 A1 Dec. 1, 2011

(51) Int. Cl.
G06F 15/173 (2006.01)
G06F 17/18 (2006.01)
G06F 11/00 (2006.01)
G06F 17/30 (2006.01)

(52) U.S. Cl. ........ 709/224; 709/223; 702/179; 702/184; 714/47.2; 707/758; 707/766

(58) Field of Classification Search ............... 707/688, 707/705, 716, 732, 752–754, 781, 780, 758, 707/766; 455/445; 370/351, 353, 354–355, 370/252, 468, 242; 345/7, 35, 594, 644; 715/735–738; 702/179–187; 709/223–225; 714/47.1–47.2

See application file for complete search history.

(56) References Cited

U.S. PATENT DOCUMENTS

| | | | | |
|---|---|---|---|---|
| 5,231,593 A | * | 7/1993 | Notess | 702/180 |
| 5,644,717 A | * | 7/1997 | Clark | 709/224 |
| 5,815,664 A | * | 9/1998 | Asano | 709/227 |
| 6,269,401 B1 | * | 7/2001 | Fletcher et al. | 709/224 |
| 6,654,803 B1 | * | 11/2003 | Rochford et al. | 709/224 |
| 6,795,400 B1 | * | 9/2004 | Schick | 370/236 |
| 6,895,430 B1 | * | 5/2005 | Schneider | 709/217 |
| 7,212,493 B2 | * | 5/2007 | Shibasaki | 370/231 |
| 7,478,151 B1 | * | 1/2009 | Maiocco et al. | 709/223 |
| 7,509,229 B1 | * | 3/2009 | Wen | 702/179 |
| 2002/0032880 A1 | * | 3/2002 | Poletto et al. | 714/4 |
| 2003/0091165 A1 | * | 5/2003 | Bearden et al. | 379/88.08 |
| 2004/0236866 A1 | * | 11/2004 | Dugatkin et al. | 709/235 |
| 2005/0060562 A1 | * | 3/2005 | Bhattacharya et al. | 713/200 |
| 2005/0219151 A1 | * | 10/2005 | Li et al. | 345/7 |
| 2006/0282795 A1 | * | 12/2006 | Clark et al. | 715/840 |

(Continued)

FOREIGN PATENT DOCUMENTS

WO WO 00/14913 * 3/2000

(Continued)

OTHER PUBLICATIONS

Brice Augustin et al. "Multipath tracing with Paris traceroute", IEEE 2007, pp. 1-8.*

(Continued)

*Primary Examiner* — Srirama Channavajjala

(57) ABSTRACT

The APPARATUSES, METHODS AND SYSTEMS FOR A REAL-TIME MULTI-HOP ROUTE REPORTER ("REPORTER") facilitates generation and provision of relevant and descriptive network performance reports that are efficient, economical and useful to executives, managers and other non-IT professionals and/or personnel. The REPORTER may be implemented as a multi-tiered web application that may collect, analyze and update database records which facilitate generation of the descriptive report. The REPORTER may include facilities for establishing correlations between various devices in the same network in order to evaluate and report the network performance.

21 Claims, 9 Drawing Sheets

U.S. PATENT DOCUMENTS

| | | | |
|---|---|---|---|
| 2007/0100997 A1* | 5/2007 | Hirschman et al. | 709/224 |
| 2007/0174426 A1* | 7/2007 | Swildens et al. | 709/217 |
| 2007/0211634 A1* | 9/2007 | Shibasaki | 370/232 |
| 2007/0291654 A1* | 12/2007 | Pepper | 370/252 |
| 2008/0071905 A1* | 3/2008 | Sullivan et al. | 709/224 |
| 2009/0083303 A1* | 3/2009 | Singh et al. | 707/102 |

FOREIGN PATENT DOCUMENTS

| | | | |
|---|---|---|---|
| WO | WO 03/060643 | * | 7/2003 |
| WO | WO 2005/029224 | * | 3/2005 |
| WO | WO 2005/093576 | * | 10/2005 |

OTHER PUBLICATIONS

Yonghwan Kim et al. "Performance Analysis of Data Packet Discarding in ATM Networks", IEEE/ACM Transactions on Networking, vol. 7, No. 2, Apr. 1999, pp. 216-227.*

Tellabs® 8000 Intelligent Network Manager Performance Management Packagem 2012, 2 pages.*

* cited by examiner

```
ch1-ne-rtr-1#traceroute ip 149.179.5.214

Type escape sequence to abort.
Tracing the route to 149.179.5.214

1 ch1-ne-rtr-3 (161.99.53.118) 0 msec 4 msec 0 msec
2 161.99.55.110 [AS 64857] 24 msec 24 msec 28 msec
3 hu1-ne-rtr-1 (161.99.52.117) [AS 64856] 28 msec 28 msec 28 msec
4 149.179.5.214 [AS 64856] 28 msec 28 msec 28 msec
ch1-ne-rtr-1#
```

FIGURE 3

| | |
|---|---|
| Hop | 1 ch1-ne-rtr-3 (161.99.53.118) 0 msec 4 msec 0 msec |
| Location | AMDC1,Chicago, IL., United States of America |
| Link | ch1-ne-rtr-3 * Port-channel2 |
| Description | VZB W0N43582 - ICL to Chicago AMDC1 ch2-ne-rtr-3 |
| Statistics | Bandwidth Utilization: Oct=4% ; Nov=6% |
| | |
| Hops | 2 161.99.55.110 [AS 64857] 24 msec 24 msec 28 msec |
| Location | Location: AMDC2,HOUSTON,TX,United States of America |
| Link | hu1-ne-rtr-3 * GigabitEthernet6/0/0 |
| Description | VZB W0N43583 - ICL to Chicago AMDC1 ch1-ne-rtr-3 |
| Statistics | Statistics: (Bandwidth Utilization: Oct=44% ; Nov=49% |
| | |
| Hops | 3 hu1-ne-rtr-1 (161.99.52.117) [AS 64856] 28 msec 28 msec 28 msec |
| Location | Location: AMDC2,HOUSTON,TX,United States of America |
| Link | hu1-ne-rtr-1 * Port-channel3 |
| Description | VZB W0N43584 - ICL to Houston AMDC2 hu1-ne-rtr-1 |
| Statistics | Statistics: (Bandwidth Utilization: Oct=6% ; Nov=9%) |
| | |
| Hop | 4 149.179.5.214 [AS 64856] 28 msec 28 msec 28 msec==> |

FIGURE 5

APPARATUSES, METHOD AND SYSTEM FOR NETWORK PERFORMANCE METRIC STATISTICS FROM TRAFFIC LINK DATA, IDENTIFYING, VIOLATING NETWORK ELEMENTS ASSOCIATED WITH THRESHOLD VIOLATION USING VISUAL CUE

BACKGROUND

Computer networks comprise a plurality of network devices or nodes connected via a communication medium. Examples of network devices include routers, switches, hubs, modems, bridges as well as interconnected computing systems called "hosts." Some computer networks are what are known as "packet switched networks." In packet switched networks, discrete data blocks called "packets" originating from a source host are routed through a network.

BRIEF DESCRIPTION OF THE DRAWINGS

The accompanying appendices and/or drawings illustrate various non-limiting, example, inventive aspects in accordance with the present disclosure:

FIG. 3 shows an implementation of a traceroute report generated by a traceroute utility.

FIG. 5 shows an implementation of a real-time multi-hop route report in one embodiment of the REPORTER;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION OF PREFERRED EMBODIMENTS

Reporter

This disclosure details the implementation of APPARATUSES, METHODS AND SYSTEMS FOR A REAL-TIME MULTI-HOP ROUTE REPORTER (hereinafter "REPORTER"). A traceroute utility shows the route taken by data packets from one host to another, including all the intermediate nodes between the hosts in a traceroute report. Traceroute reports may be used by Information Technology (IT) professionals who wish to determine where a network bottleneck is at the time the report is generated. The value of a traceroute report that does not provide any description of its contents may be limited for a non-IT professional (e.g., a manager). Embodiments of the REPORTER may facilitate generation and provision of relevant and descriptive network performance reports that are efficient, economical and useful to executives, managers and other non-IT professionals/personnel. In one embodiment, the REPORTER may establish correlations between various devices in the same network in order to evaluate and report the network performance. In a further embodiment, the REPORTER may take the form of a customer accessible web application for requesting a real-time multi-hop route report (hereinafter "descriptive report"). The customer may input target and/or source host addresses and execute a single command instruction (e.g., a mouse click, a keyboard return, a touch screen tap, and/or the like) to generate a full blown descriptive report. The descriptive report may depict the multi-hop route i.e., the hosts and intermediate nodes traversed by the trace data packets.

Figure 1:
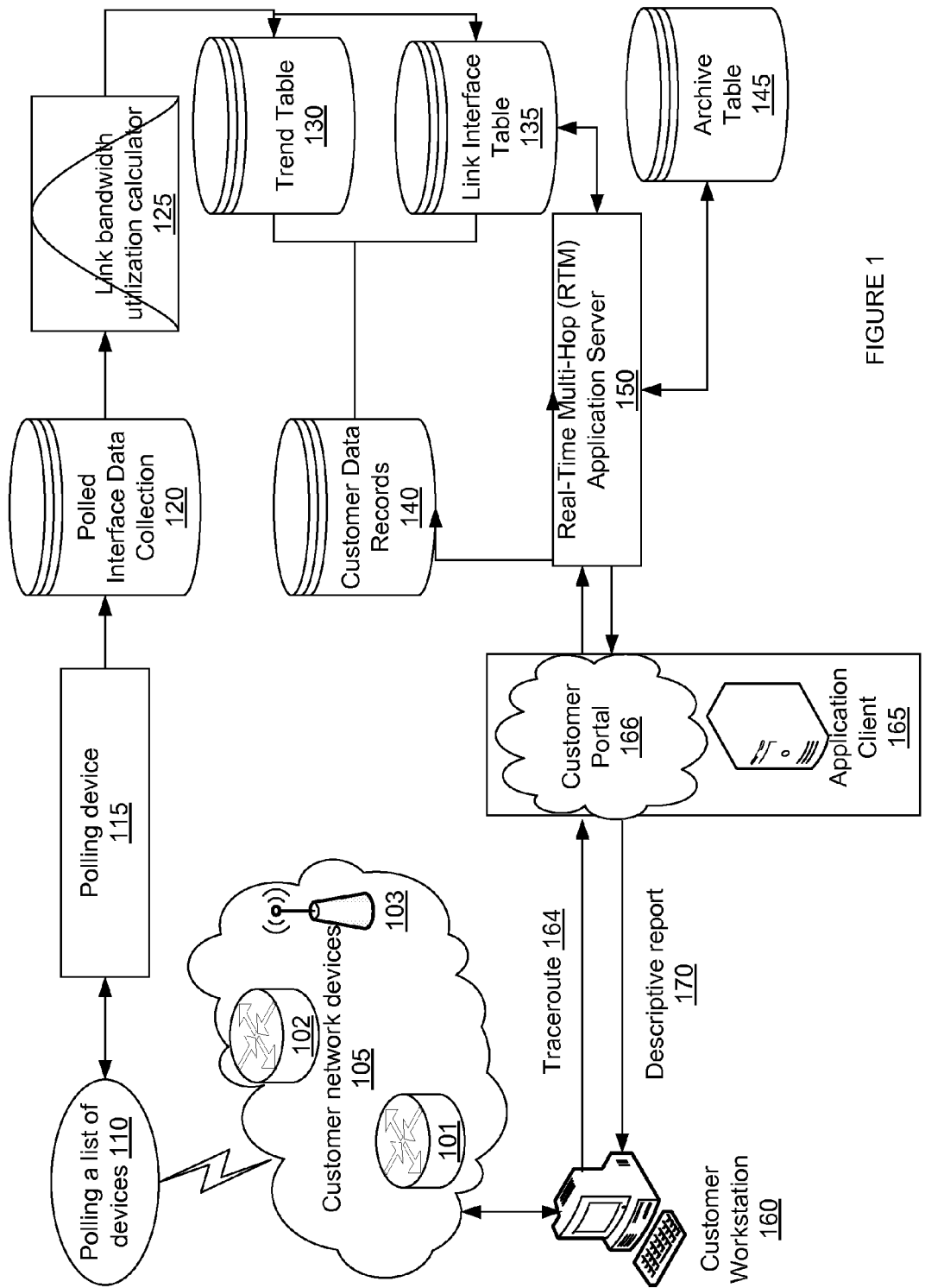
FIG. 1 provides an overview of an implementation of REPORTER components and affiliated entities in an embodiment of REPORTER operation.

FIG. 1 provides an overview of an implementation of REPORTER components and affiliated entities in an embodiment of REPORTER operation. In one embodiment, the REPORTER may be configured as a multi-tiered web application. It may comprise a front-end application client 165 in communication with customers through a customer portal 166 and a back-end application server 150 in communication with a number of tables and/or databases 130, 135 and 140. In one implementation, tables and/or databases may be customer specific. The REPORTER may be configured to provide a customer at a workstation 160 access to its reporting services via the customer portal 166 hosted on the application client 165. In one embodiment, the REPORTER may be equipped to receive from the customer source and/or target host addresses via a web form and instruction to generate a descriptive report via a dialog. In an implementation, the REPORTER may allow a customer to input a host address by selecting a link from a drop down menu under a web browser favorites/bookmarks menu. In an alternate implementation, the REPORTER may allow the customer to upload a traceroute report for processing. The REPORTER may serve to facilitate generation of the descriptive report 170 via the application server 150 and conveyance of the descriptive report 170 from the application server 150 to the customer portal 166 for viewing by the customer on the workstation 160. In a further embodiment, the REPORTER may be coupled with an archive table and/or database 145 to facilitate archival and retrieval of generated descriptive reports 170.

In one embodiment, FIG. 1 provides an overview of how the REPORTER may collect, analyze and update database records which facilitate generation of the descriptive report 170. A plurality of customer network devices 101, 102 and 103 (e.g., routers, switches, IP phones, and/or the like) may be operative in a customer network 105. In one implementation, each customer network device may be associated with one or more network addresses such as an IP (Internet Protocol) address, a MAC (Media Access Control) address, and/or the like. In one implementation, a customer network may be a local area network (LAN) or a wide area network (WAN). In one implementation, the REPORTER may comprise a polling device 110 configured to scan and poll a list of network devices 101-103, such as routers, switches, IP phones, and/or the like at regular intervals of time (e.g., every 5 minutes). The polling device 110 may be coupled with a polled interface data store 120, which may store interface and/or link traffic network data such as traffic volume, traffic rate, and/or the like. In one implementation, the REPORTER may also comprise a link bandwidth utilization calculator module 125 configured for example to utilize the polled interface data from data store 120 to calculate the minimum bandwidth required to sustain load accumulated within a month sliding window (e.g., current month). In one implementation, the bandwidth utilization calculator 125 may be coupled with tables 130 and/or 135, which may store the calculated bandwidth data.

Figure 2:
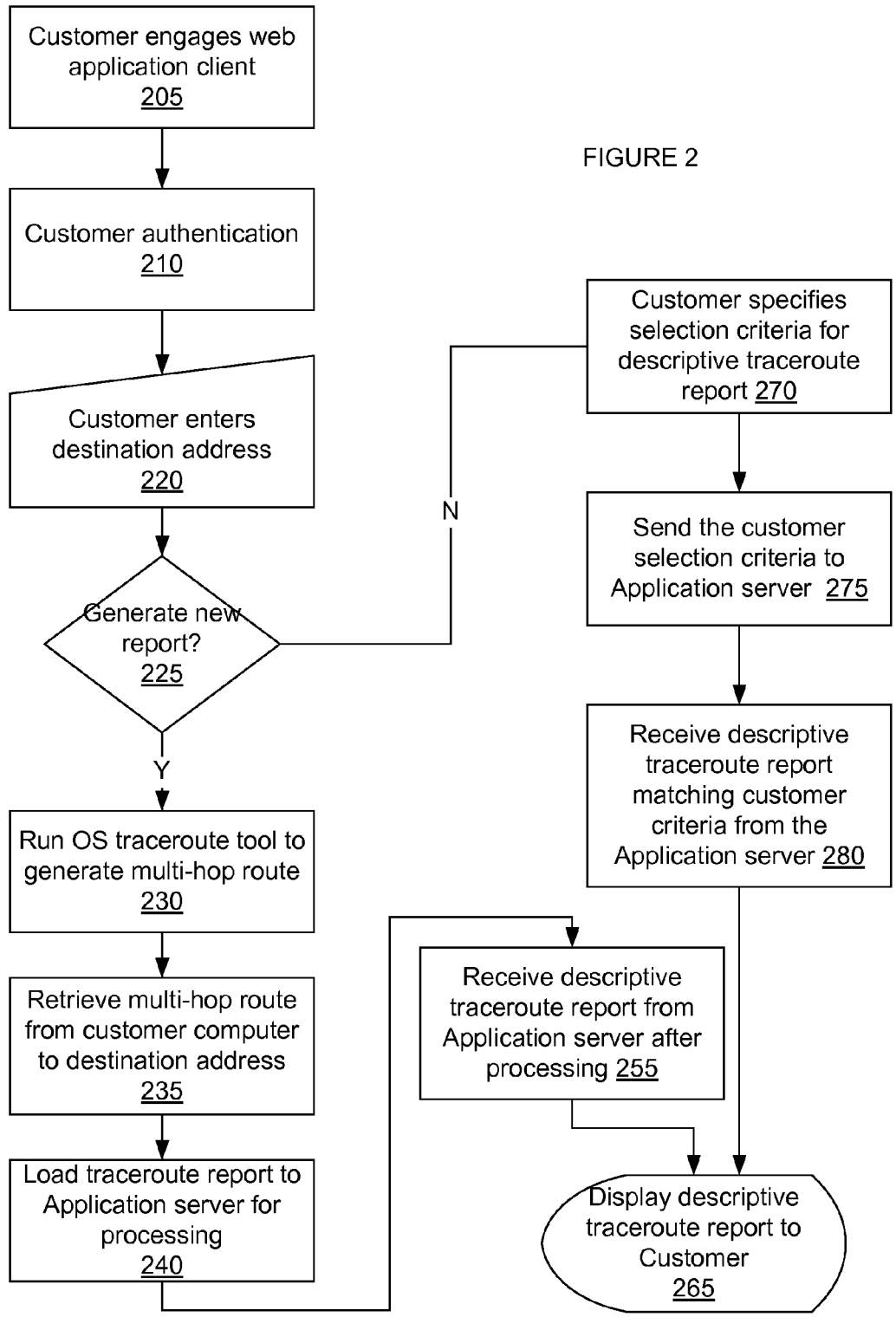
FIG. 2 shows an implementation of logic flow for client-side traceroute processing in one embodiment of the REPORTER.

FIG. 2 shows an implementation of logic flow for client-side traceroute processing in one embodiment of the REPORTER. A customer may engage the web application at 205 (e.g., via the customer portal 166) and request authentication to access the services of the REPORTER at 210 (e.g., by entering a username and a password, security certificate, and/or the like). In one embodiment, a determination may be made whether the customer's credentials are correct. If the customer's credentials are not verified, the customer may be provided a link by which he/she can request access to the customer portal 166 from the network administrator. If the customer's credentials are verified, a user interface may be provided to the customer. The customer may enter or select destination address at 220. In an alternate implementation, the customer may enter or select a source address. In one implementation, the user interface may be configured to allow a customer to input a host address by selecting a link from a drop down menu under the web browser favorites/bookmarks menu. A determination may be made at 225 whether a new report is to be generated or an archived report is to be retrieved. If the customer requested a new report, a traceroute tool may be called at 230 to generate a multi-hop route taken by data packets as they travel from a source host to a target host. In one implementation, a traceroute tool that is available on Operating Systems such as UNIX® ("tracerourte"), Mac OS® ("traceroute") and Windows® 95 or later ("tracert") may be called. In an alternate implementation, executable traceroute programs may be downloaded and used for generating a traceroute report. The generated traceroute report may be retrieved from the customer desktop at 235 and uploaded to the application server at 240. In one implementation, a traceroute report file generated by a traceroute tool may be uploaded by the customer to the application server. In one implementation, the traceroute report may be processed to generate a descriptive report by the application server. The descriptive report may be received by the application client at 255 and displayed to the customer at 265. In an alternate embodiment, the customer may request to retrieve an archived report at 225. The customer may then select one or more archived descriptive reports. In one implementation, the customer may specify one or more criteria (e.g., date, time, IP address, location, and/or the like) for selecting and retrieve one or more archived reports at 270. The customer-specified selection criteria may be sent to the application server at 275 to retrieve archived records matching the specified criteria. At 280, the application client may receive the matching archived descriptive reports and at 265, may display the report to the customer.

FIG. 3 shows an implementation of a traceroute report generated by a traceroute utility. The traceroute report as shown depicts the IP address of each hop as data packets traverse through a network from a source to destination. Such a report may be generated using OS traceroute tools such as traceroute, tracert, and/or the like. In one implementation, the multi-hop route at 235, FIG. 2 may be similar to the traceroute report shown in FIG. 3.

Figure 4A:
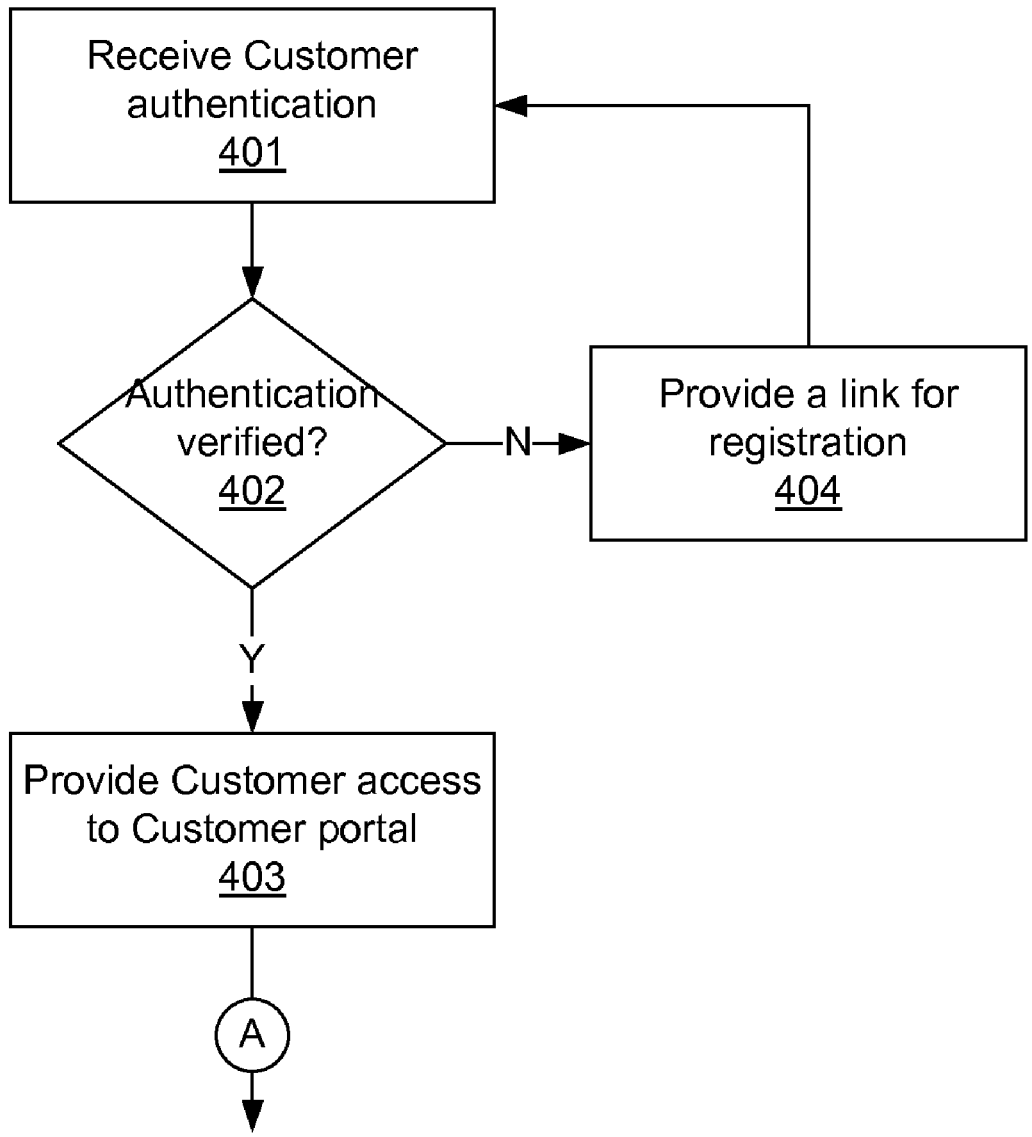
FIG. 4a shows an implementation of logic flow for server-side authentication in one embodiment of the REPORTER.

FIG. 4a shows an implementation of logic flow for server-side authentication in one embodiment of the REPORTER. In one implementation, the application server may allow only authorized customers to utilize the processing services. In one implementation, the application server may receive authentication data provided by a customer at 401. The application server may make a determination whether the authentication data is correct at 402. If the authentication data is successfully verified, the application server may provide the requesting customer access to the processing facilities via the customer portal at 403. In one implementation, the authentication data may not be verifiable. The application server may in one implementation provide a link to the customer registration at 404. In an alternate implementation, the application server may request the customer to re-enter authentication information for re-verification.

Figure 4B:
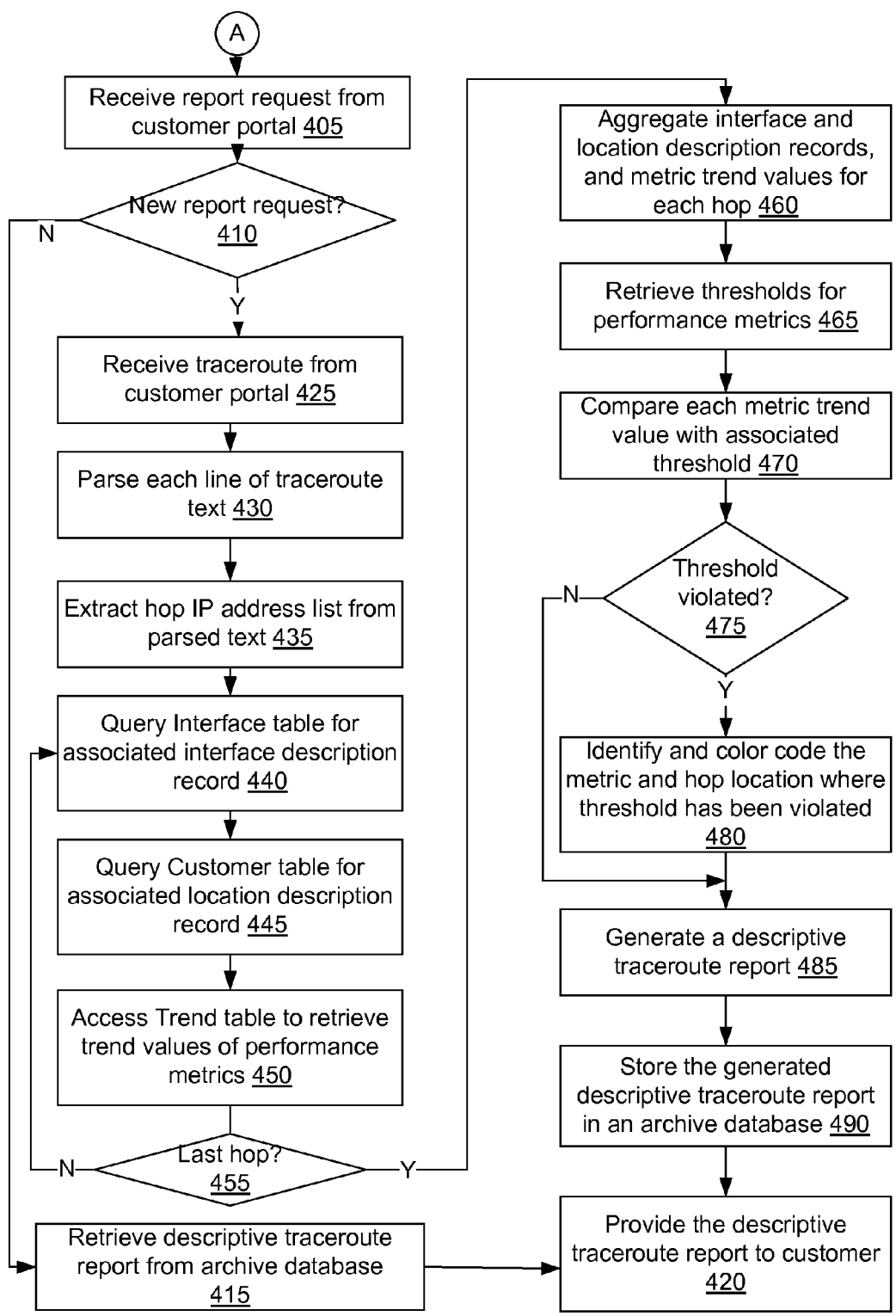
FIG. 4b shows an implementation of logic flow for server-side traceroute processing in one embodiment of the REPORTER.

FIG. 4b shows an implementation of logic flow for server-side traceroute processing in one embodiment of the REPORTER. In one embodiment, the application server may facilitate retrieval, processing, analysis and aggregation of network data. In one implementation, the application server, after successfully authenticating the customer, may receive a report request at 405 from a customer via the customer portal. A determination may be made at 410 whether a new report or an archived report is requested. If an archived report is requested, the requested descriptive report may be retrieved from the archive database at 415 and provided to the user at 420. In one implementation, the request for archived report may be accompanied by one or more criteria, including but not limited to: date and/or time of report generation, source and/or target host network addresses, location, location appearing most frequently, and/or the like. In a further embodiment, an archived database may be queried based on the provided criteria and descriptive reports matching those criteria may be retrieved and uploaded to the application client for presentation to the user.

In an alternate embodiment, a new report request may be received at 425 accompanied by the OS generated traceroute report. Each line of the received traceroute text may be parsed at 430. In one implementation, each line of the received traceroute text may be parsed using scripting languages such as JavaScript®, ASP, PHP, and/or the like. For example, a single line of traceroute text may read as below:

3 hu1-ne-rtr-1 (161.99.52.117) [AS 64856] 28 msec 28 msec 28 msec

This line of text may be parsed as:

```
String traceroute = "3 hu1-ne-rtr-1 (161.99.52.117) [AS 64856] 28 msec 28 msec 28 msec";
String delims = "[ ]";
String[ ] tokens = traceroute.split(delims);
```

After the code is executed, the variable "tokens" may contain an array of strings:

```
"3", "hu1-ne-rtr-1","(161.99.52.117)","[AS",
"64856]","28","msec","28","msec","28","msec"
```

In one implementation, parsed strings may be converted into XML format as shown below:

```
<node>
    <number>1</number>
    <routername>hu1-ne-rtr-1</routername>
    <ipaddress>161.99.52.117</ipaddress>
    <ref>AS 64856</ref>
    <ttl1>28</ttl1>
    <ttl2>28</ttl2>
    <ttl3>28</ttl3>
</node>
```

A hop IP address list may be extracted from the parsed text at 435. The extracted hop IP addresses identify the IP address of each network device through which the sent data packets passed. For each extracted IP address, at 440 the Interface table may be queried for associated description record. Queries may be implemented using query languages such as Structured Query Language (SQL), QUEL, Squery, and/or the like. In one embodiment, querying the Interface table may provide descriptive data associated with an IP address including, but not limited to: router name (e.g., hu1-ne-rtr-1), interface description name (e.g., Port-channel3), interface description (e.g., VZB WON43582—ICL to Houston AMDC2 hu1-ne-rtr-1), and/or the like. In one implementation, a query for interface descriptive record based on IP address may be constructed as below:

```
SELECT * FROM Interface_table
WHERE IPaddress= '161.99.52.117'
```

In one embodiment, a query to a Customer table for location of each hop may be initiated at 445. In one implementation, the query may be based on the associated interface description record. In one implementation, the query to the Customer table may yield information, including but not limited to: site location name (e.g., AMDC1), geographical region (e.g., Chicago, Ill., United States of America), type of service (e.g., Voice-over-IP), and/or the like.

In one embodiment, a Trend table may be accessed at 450 to retrieve network performance metric statistics associated with each hop IP address. In one implementation, the performance metrics stored in a Trend table may include, but are not limited to: bandwidth utilization in percentage (e.g., Oct=4%, Nov=6%), number of frames discarded, number of errors, link availability per a fixed interval of time, and/or the like. In one implementation, the retrieved interface, customer and trend records for each hop IP address may be aggregated at 460. In one implementation, a threshold may be associated with each performance metric. In a further implementation, the threshold may be a default value, may be set per an associated Service Level Agreement (SLA), set by the customer or administrator, and/or the like. At 465, the associated thresholds for each performance metric may be retrieved from the Trend table. In one implementation, a comparison between each metric trend value and the associated threshold may be made at 470. A determination may be made at 475 whether any threshold was violated. If the trend value for each metric respected the associated threshold, a descriptive report may be generated at 485, a copy of which may be stored at 490 and the report may be provided to the customer via the application client at 420. The customer using the Customer portal may conveniently download the report for viewing and/or saving in a computer readable medium. In an alternate implementation, if the trend value for one or more metric failed to respect the threshold set, the disrespecting metric and the hop location may be identified, for example, by color coding, formatting, and/or the like at 480. A descriptive report including the identified and color coded disrespecting metric and associated hop location may be generated at 485 and made available for viewing and/or downloading by the customer via the customer portal at 420. In one embodiment, a copy of the color coded descriptive report may be stored in the archive database at 490.

Facilities of the REPORTER may be used in one implementation of deployment of an application program at a data center to be remotely accessed by employees. For a successful deployment, the customer may carry out a complete study of all links between the server and the client machines subnet. Such a study may advise whether the deployment can continue or not. It may further advise as to which links in particular are problematic. The facilities of the REPORTER may in one implementation allow this type of study to be carried out and understood by a non-IT personnel.

In one implementation, the REPORTER may facilitate a customer request for a descriptive report from a source host that is not in the customer network or is at the time inaccessible. In such situations, the REPORTER may query one or more databases to determine an interface closest to the customer-specified source host. In a further implementation, the REPORTER may access the closest interface device and call a traceroute tool from the device to a target host to generate a traceroute report.

In another implementation, the REPORTER may be used in the area of internet telephony services such as Voice over Internet Protocol (VoIP/IP) telephony, facsimile, and/or the like. In one implementation, non-IT managers and Executives may make VoIP calls that may be of lesser quality than the Public Switched Telephone Network (PSTN). For example, IP data packets may get lost or delayed in transit from a source phone to a destination phone. Non-IT managers and Executives may use the services of the REPORTER to generate a traceroute from their workstations to a destination phone. In a further implementation, the REPORTER may receive the generated traceroute to the destination phone and retrieve associated descriptive data and statistics from one or more tables and/or databases to create a descriptive report. In one implementation, the REPORTER may specifically identify links as bottlenecks where, for example, packet loss rate and/or delay is above a predefined threshold.

FIG. 5 shows an implementation of a real-time multi-hop route report in one embodiment of the REPORTER. In one embodiment, the descriptive report generated by the RTM application server may depict each hop IP address from the conventional traceroute and include descriptive details associated with each hop including, location, link/interface, description, statistics, and/or the like.

Figure 6:
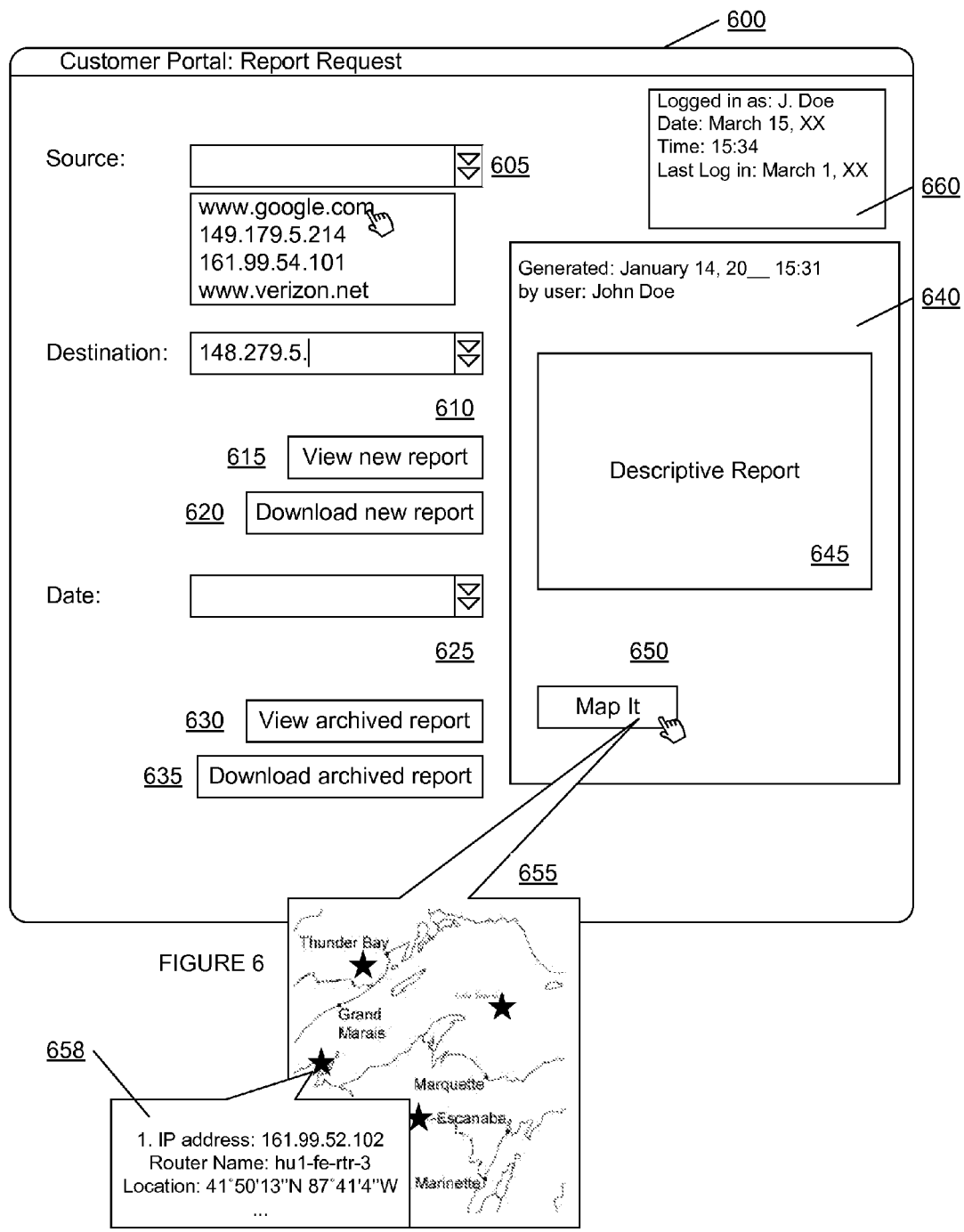
FIG. 6 shows an implementation of a customer portal user interface in one embodiment of the REPORTER.

FIG. 6 shows an implementation of a customer portal user interface in one embodiment of the REPORTER. In one implementation, a report request page 600 may include text boxes 605 for source host address input and 610 for destination host address input. In one implementation, a customer may type source/destination address or select an address from a drop down menu. If a source is not specified, the default source (e.g., customer workstation) may automatically be selected. In an alternate implementation, the user interface may be configured to allow a customer to input a host address by selecting a link from a drop down menu under the web browser favorites/bookmarks menu. The report request page may include a view new report button 615 and/or a download new button 620, which when activated causes generation of a new report and provision of the generated report for viewing and downloading respectively. In one implementation, the report request page includes an area 640 where the requested report may be displayed. In an alternate implementation, a customer may retrieve an archived descriptive report. The report request page may include a text box 625 where a customer may enter or select a date and request to view or download one or more archived reports generated on the specified date. In a further implementation, other criteria for selection (e.g., IP address, location, link, and/or the like) may be provided in the user interface for retrieving a selection of archived descriptive reports. Corresponding view archived report button 630 and download archived report button 635 may also be available for viewing and downloading archived descriptive reports. The user interface may further include a status box 660 for displaying log in information such as a customer name, date and time of log in, last login date and/or time, and/or the like. In one implementation, the user interface may be configured to generate a web diagram upon activation of a map it button 650. The web diagram, in one implementation, may comprise the contents of the descriptive report displayed graphically. In one implementation, mapping utilities provided by Application Programming Interfaces (APIs) such as Google Maps API may be utilized to manipulate and present geographical data. For example, site locations of all hops may be mapped as shown in 655. In a further implementation, additional descriptive information associated with each hop may be displayed in a pop-up box 658. The pop-up box may be activated by clicking or hovering over a hop icon (for e.g., star as shown).

Figure 7:
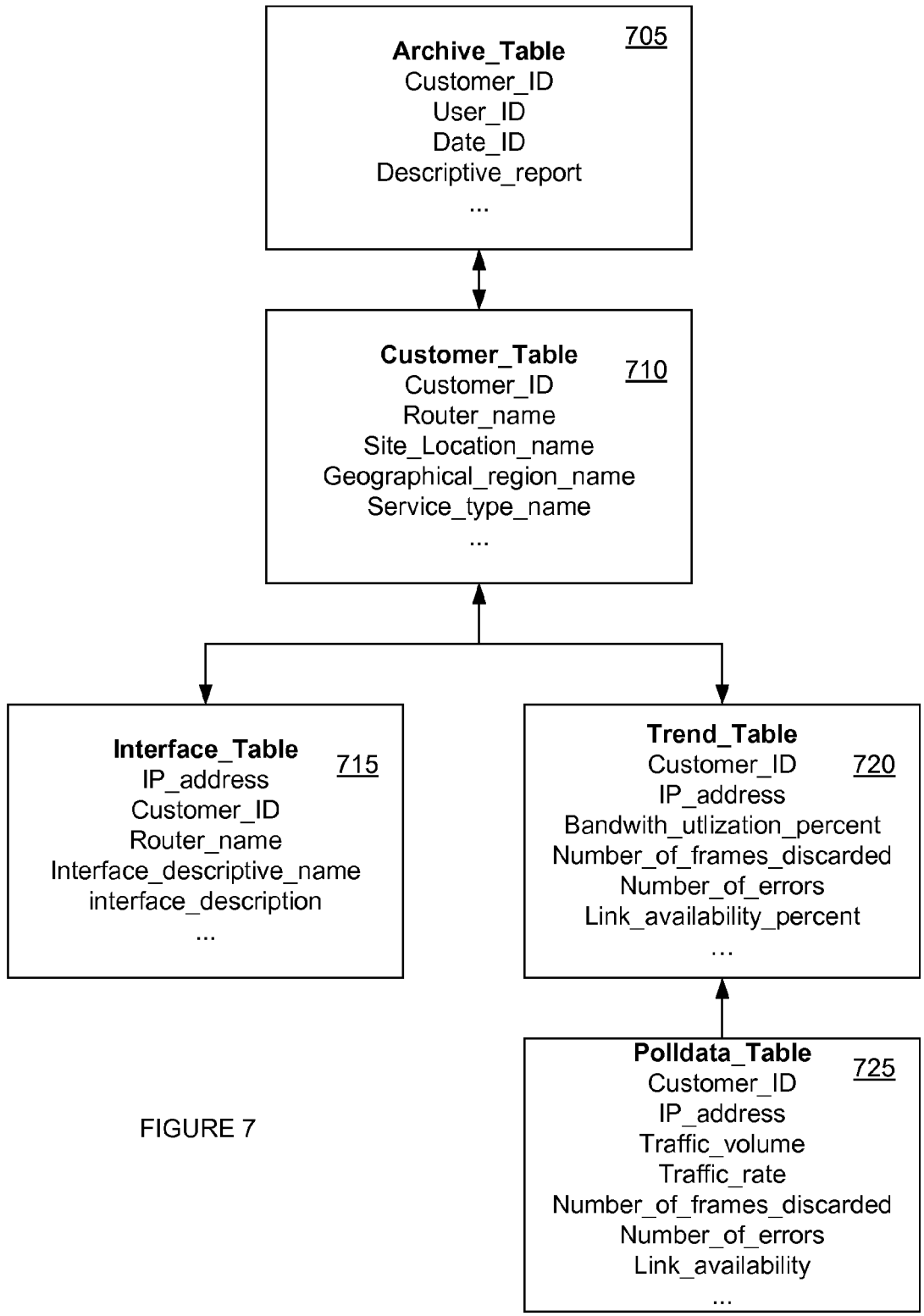
FIG. 7 shows an overview of database tables in one embodiment of the REPORTER.

FIG. 7 shows an overview of database tables in one embodiment of the REPORTER. A Polldata table 725 may comprise network traffic data collected from polling and scanning of computer network devices. The Polldata table 725 may provide real-time data for generating current statistics and trends related to network performance stored in a Trend table 720. In one implementation, a Trend table 720 may be linked to both an Interface table 715 and a Customer table 710. Such a linkage may facilitate retrieval of data records by using shared fields such as IP_address and Customer_ID. In one implementation, a Customer table 710 may be linked to an Archive table 705 where descriptive records may be archived for future reference.

REPORTER Controller

Figure 8:
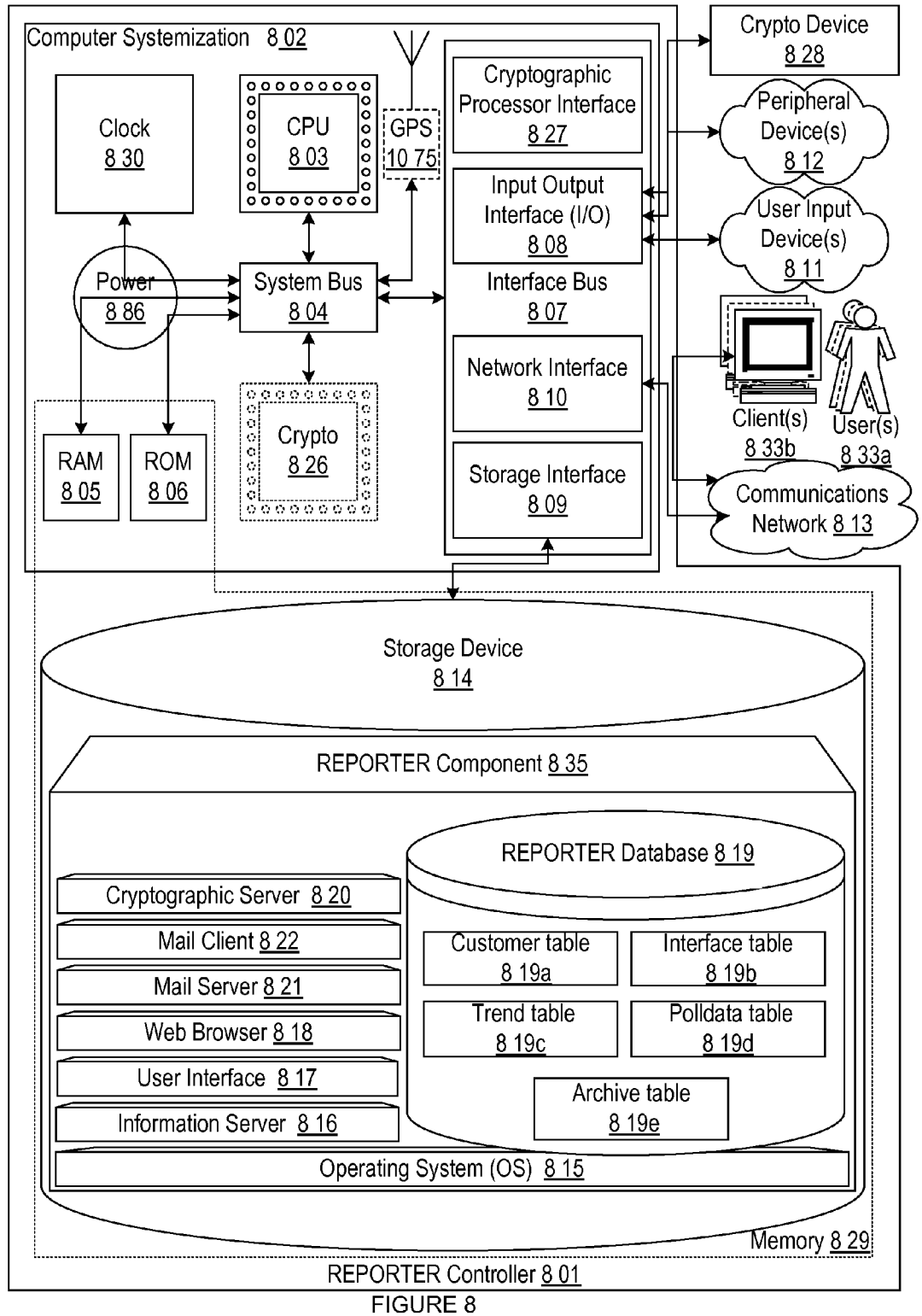
FIG. 8 is of a block diagram illustrating embodiments of the REPORTER controller.

FIG. 8 illustrates inventive aspects of a REPORTER controller 801 in a block diagram. In this embodiment, the REPORTER controller 801 may serve to aggregate, process, store, search, serve, identify, instruct, generate, match, and/or facilitate interactions with a computer through network traffic data aggregation, processing, evaluation and presentation technologies, and/or other related data.

Typically, users, which may be people and/or other systems, may engage information technology systems (e.g., computers) to facilitate information processing. In turn, computers employ processors to process information; such processors 803 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the REPORTER controller 801 may be connected to and/or communicate with entities such as, but not limited to: one or more users from user input devices 811; peripheral devices 812; an optional cryptographic processor device 828; and/or a communications network 813.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The REPORTER controller 801 may be based on computer systems that may comprise, but are not limited to, components such as: a computer systemization 802 connected to memory 829.

Computer Systemization

A computer systemization 802 may comprise a clock 830, central processing unit ("CPU(s)" and/or "processor(s)" (these terms are used interchangeable throughout the disclosure unless noted to the contrary)) 803, a memory 829 (e.g., a read only memory (ROM) 806, a random access memory (RAM) 805, etc.), and/or an interface bus 807, and most frequently, although not necessarily, are all interconnected and/or communicating through a system bus 804 on one or more (mother)board(s) 802 having conductive and/or otherwise transportive circuit pathways through which instructions (e.g., binary encoded signals) may travel to effect communications, operations, storage, etc. Optionally, the computer systemization may be connected to an internal power source 886. Optionally, a cryptographic processor 826 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the REPORTER controller and beyond through various interfaces. Should processing requirements dictate a greater amount speed and/or capacity, distributed processors (e.g., Distributed REPORTER), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the REPORTER may be achieved by implementing a microcontroller such as CAST's R8051XC2 microcontroller; Intel's MCS 51 (i.e., 8051 microcontroller); and/or the like. Also, to implement certain features of the REPORTER, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the REPORTER component collection (distributed or otherwise) and/or features may be implemented via the microprocessor and/or via embedded components; e.g., via ASIC, coprocessor, DSP, FPGA, and/or the like. Alternately, some implementations of the REPORTER may be implemented with embedded components that are configured and used to achieve a variety of features or signal processing.

Depending on the particular implementation, the embedded components may include software solutions, hardware solutions, and/or some combination of both hardware/software solutions. For example, REPORTER features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the REPORTER features. A hierarchy of programmable interconnects allow logic blocks to be interconnected as needed by the REPORTER system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the REPORTER may be developed on regular FPGAs and then migrated into a fixed version that more resembles ASIC implementations. Alternate or coordinating implementations may migrate REPORTER controller features to a final ASIC instead of or in addition to FPGAs. Depending on the implementation all of the aforementioned embedded components and microprocessors may be considered the "CPU" and/or "processor" for the REPORTER.

Power Source

The power source 886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the REPORTER thereby providing an electric current to all subsequent components. In one example, the power source 886 is connected to the system bus component 804. In an alternative embodiment, an outside power source 886 is provided through a connection across the I/O 808 interface. For example, a USB and/or IEEE 1394 connection carries both data and power across the connection and is therefore a suitable source of power.

Interface Adapters

Interface bus(ses) 807 may accept, connect, and/or communicate to a number of interface adapters, conventionally although not necessarily in the form of adapter cards, such as but not limited to: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 810 may accept, communicate, and/or connect to a communications network 813. Through a communications network 813, the REPORTER controller is accessible through remote clients 833b (e.g., computers with web browsers) by users 833a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed REPORTER), architectures may similarly be employed to pool, load balance, and/or otherwise increase the communicative bandwidth required by the REPORTER controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to user input devices 811, peripheral devices 812, cryptographic processor devices 828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides composited video information through a video connection interface that accepts a video display interface (e.g., an RCA composite video connector accepting an RCA composite video cable; a DVI connector accepting a DVI display cable, etc.).

User input devices 811 may be card readers, dongles, finger print readers, gloves, graphics tablets, joysticks, keyboards, mouse (mice), remote controls, retina readers, trackballs, trackpads, and/or the like.

Peripheral devices 812 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the REPORTER controller may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the REPORTER controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 829. However, memory is a fungible technology and resource, thus, any number of memory embodiments may be employed in lieu of or in concert with one another. It is to be understood that the REPORTER controller and/or a computer systemization may employ various forms of memory 829. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 829 will include ROM 806, RAM 805, and a storage device 814. A storage device 814 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 829 may contain a collection of program and/or database components and/or data such as, but not limited to: operating system component(s) 815 (operating system); information server component(s) 816 (information server); user interface component(s) 817 (user interface); Web browser component(s) 818 (Web browser); database(s) 819; mail server component(s) 821; mail client component(s) 822; cryptographic server component(s) 820 (cryptographic server); the REPORTER component(s) 835; and/or the like (i.e., collectively a component collection). These components may be stored and accessed from the storage devices and/or from storage devices accessible through an interface bus. Although non-conventional program components such as those in the component collection, typically, are stored in a local storage device 814, they may also be loaded and/or stored in memory such as: peripheral devices, RAM, remote storage facilities through a communications network, ROM, various forms of memory, and/or the like.

Operating System

The operating system component 815 is an executable program component facilitating the operation of the REPORTER controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the REPORTER controller to communicate with other entities through a communications network 813. Various communication protocols may be used by the REPORTER controller as a subcarrier transport mechanism for interaction, such as, but not limited to: multicast, TCP/IP, UDP, unicast, and/or the like.

Information Server

An information server component 816 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the REPORTER controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the REPORTER database 819, operating systems, other program components, user interfaces, Web browsers, and/or the like.

Access to the REPORTER database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the REPORTER. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the REPORTER as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 817 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 818 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the REPORTER enabled nodes. The combined application may be nugatory on systems employing standard Web browsers.

Mail Server

A mail server component 821 is a stored program component that is executed by a CPU 803. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the REPORTER.

Access to the REPORTER mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 822 is a stored program component that is executed by a CPU 803. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 820 is a stored program component that is executed by a CPU 803, cryptographic processor 826, cryptographic processor interface 827, cryptographic processor device 828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the REPORTER may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the REPORTER component to engage in secure transactions if so desired. The cryptographic component facilitates the secure accessing of resources on the REPORTER and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The REPORTER Database

The REPORTER database component 819 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the REPORTER database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the REPORTER database is implemented as a data-structure, the use of the REPORTER database 819 may be integrated into another component such as the REPORTER component 835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 819 includes several tables 819*a-e*. A Customer table 819*a* includes fields such as, but not limited to: a customer_ID, router_name, site_location_name, geographical_region_name, service_type_name, latitude_co-ordinates, longitude_co-ordinates, and/or the like. The user table may support and/or track multiple entity accounts on a REPORTER. An Interface table 819*b* includes fields such as, but not limited to: IP_address, MAC_address, customer_ID, router_name, interface_descriptive_name, interface_description, time_zone, language, last_update_date, and/or the like. A Trend table 819*c* includes fields such as, but not limited to: IP_address, MAC_address, customer_ID, bandwidth_utilization_percent, number_of_frames_discarded, number_of_errors, link_availability_percent, network_speed, and/or the like. A Polldata table 819*d* includes fields such as, but not limited to: IP_address, MAC_address, customer_ID, traffic_volume, traffic_rate, number_of_frames_discarded, number_of_errors, link_availability, and/or the like. An Archive table 819*e* includes fields such as, but not limited to: customer_ID, user_ID, date_ID, _IP_address, MAC_address, descriptive_report, and/or the like.

In one embodiment, the REPORTER database may interact with other database systems. For example, employing a distributed database system, queries and data access by search REPORTER component may treat the combination of the REPORTER database, an integrated data security layer database as a single database entity.

In one embodiment, user programs may contain various user interface primitives, which may serve to update the REPORTER. Also, various accounts may require custom database tables depending upon the environments and the types of clients the REPORTER may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 819*a-e*. The REPORTER may be configured to keep track of various settings, inputs, and parameters via database controllers.

The REPORTER database may communicate to and/or with other components in a component collection, including itself, and/or facilities of the like. Most frequently, the REPORTER database communicates with the REPORTER component, other program components, and/or the like. The database may contain, retain, and provide information regarding other nodes and data.

The REPORTERs

The REPORTER component 835 is a stored program component that is executed by a CPU. In one embodiment, the REPORTER component incorporates any and/or all combinations of the aspects of the REPORTER that was discussed in the previous figures. As such, the REPORTER affects accessing, obtaining and the provision of information, services, transactions, and/or the like across various communications networks.

The REPORTER component enables the aggregation, processing, evaluation and presentation of network traffic data, and/or the like and use of the REPORTER.

The REPORTER component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the REPORTER server employs a cryptographic server to encrypt and decrypt communications. The REPORTER component may communicate to and/or with other components in a component collection, including itself, and/or facilities of the like. Most frequently, the REPORTER component communicates with the REPORTER database, operating systems, other program components, and/or the like. The REPORTER may contain, communicate, generate, obtain, and/or provide program component, system, user, and/or data communications, requests, and/or responses.

Distributed REPORTERs

The structure and/or operation of any of the REPORTER node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the REPORTER controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http://. . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment. The following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and improve over previous works, the application is directed to APPARATUSES, METHODS AND SYSTEMS FOR A REAL-TIME MULTI-HOP ROUTE REPORTER. The entirety of this application (including the Cover Page, Title, Headings, Field, Background, Summary, Brief Description of the Drawings, Detailed Description, Claims, Abstract, Figures, Appendices, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a REPORTER individual and/or enterprise user, database configuration and/or relational model, data type, data transmission and/or network framework, syntax structure, and/or the like, various embodiments of the REPORTER, may be implemented that enable a great deal of flexibility and customization. For example, aspects of the REPORTER may be adapted for evaluating networks and managing deployment of applications to servers. While various embodiments and discussions of the REPORTER have been directed to generation and provision of descriptive network report, however, it is to be understood that the embodiments described herein may be readily configured and/or customized for a wide variety of other applications and/or implementations.

What is claimed is:

1. A processor-implemented method for generating a network report, comprising:

receiving from a customer a network report request specifying a source and a target of a data path;

obtaining traceroute data in response to the network report request, the traceroute data being indicative of the data path through a plurality of network elements between the source and the target;

extracting, by a processor, from the traceroute data at least one network address of the plurality of network elements in the data path;

constructing, by the processor, a network element description match query for the at least one extracted network address;

executing, by the processor, the constructed query on at least one network element database;

collecting traffic link data from at least one of the plurality of network elements;

retrieving at least one network element data record based on the executing, the at least one network element data record comprising at least one network performance metric statistic determined based on traffic link data associated with the at least one network element data record;

accessing the at least one network performance metric statistic from the at least one network element data record;

comparing the at least one network performance metric statistic with at least one threshold to detect at least one threshold violation;

identifying at least one violating network element associated with the at least one threshold violation; and generating the requested network report comprising a correlated listing of the at least one extracted network address and the at least one network element data record, wherein the at least one violating network element is identified using at least one visual cue.

2. The method of claim 1, wherein obtaining the traceroute data further comprises:

transmitting at least one trace data packet from a customer terminal to the target; and receiving in response to the transmitted at least one trace data packet the traceroute data.

3. The method of claim 1, further comprising:
retrieving the traffic link data collected during a specified period of time;
generating a plurality of network performance metric statistics from the retrieved traffic link data; and
storing the generated plurality of network performance metric statistics in the at least one network element database.

4. The method of claim 3, wherein the plurality of network performance metric statistics include: bandwidth utilization percentage, number of link discards, number of link errors and link availability.

5. The method of claim 3, wherein each of the plurality of network performance metric statistics is associated with a threshold.

6. The method of claim 5, further comprising:
determining a corresponding geographic location of the at least one violating network element, wherein the requested network report identifies the corresponding geographic location using the at least one visual cue.

7. The method of claim 1, wherein the at least one visual cue includes at least one of: a color coding scheme; and a text highlighting scheme.

8. The method of claim 1, wherein the at least one network element data record comprises identifying descriptive information associated with the at least one extracted network address.

9. The method of claim 8, wherein the identifying descriptive information comprises: a network element name, a network element interface descriptive name and a network element interface type.

10. The method of claim 1, wherein the at least one network element data record comprises customer information associated with the at least one extracted network address.

11. The method of claim 10, wherein the associated customer information comprises: customer identity, a network element physical address, a network element geographical location and a type of service.

12. The method of claim 1, wherein the at least one network element data record comprises a network element geographic location; and further comprising:
mapping the network element geographical location on a map; and
providing the map for display.

13. The method of claim 1, wherein receiving the network report request from the customer further comprises:
verifying whether the customer is an authorized customer;
providing the authorized customer access to a web portal comprising a web form; and
receiving the network report request via a single interaction with a web form element on the web form.

14. The method of claim 13, wherein the web form element comprises a text box element and the network report request comprises at least one of a source designation and a target designation typed into the text box.

15. The method of claim 13, wherein the web form element comprises a selectable link and the network report request comprises a selection of at least one of a source address designation or a target address designation specified by the selectable link.

16. The method of claim 1, further comprising:
archiving the generated network report in a network element archive database.

17. The method of claim 1, wherein the generated network report is a web diagram.

18. The method of claim 1, wherein the generated network report identifies at least one of the following for the at least one extracted network address: a network element name, a network interface name, a network interface description, a network element location, a customer identity, a type of service and a plurality of performance metric statistics.

19. The method of claim 1, further comprising:
transmitting the generated network report over a communication network to a customer portal for presentation to the requesting customer.

20. A system, comprising:
a memory;
a processor disposed in communication with said memory, and configured to issue a plurality of processing instructions stored in the memory, wherein the processor issues instructions to:
receive from a customer a network report request specifying a source and a target of a data path;
obtain traceroute data in response to the network report request, the traceroute data being indicative of a data path through a plurality of network elements between the source and the target;
extract from the traceroute data at least one network address of the plurality of network elements in the data path;
construct a network element description match query for the at least one extracted network address;
execute the constructed query on at least one network element database;
collect traffic link data from at least one of the plurality of network elements;
retrieve at least one network element data record based on the executing, the at least one network element data record comprising at least one network performance metric statistic determined based on traffic link data associated with the at least one network element data record;
access the at least one network performance metric statistic from the at least one network element data record;
compare the at least one network performance metric statistic with at least one threshold to detect at least one threshold violation;
identify at least one violating network element associated with the at least one threshold violation; and
generate the requested network report comprising a correlated listing of the at least one extracted network address and the at least one network element data record, wherein the at least one violating network element is identified using at least one visual cue.

21. A processor-readable medium storing processor-issuable instructions to:
receive from a customer a network report request specifying a source and a target of a data path;
obtain traceroute data in response to the network report request, the traceroute data being indicative of a data path through a plurality of network elements between the source and the target;
extract from the traceroute data at least one network address of the plurality of network elements in the data path;
construct a network element description match query for the at least one extracted network address;
execute the constructed query on at least one network element database;
collect traffic link data from at least one of the plurality of network elements;

retrieve at least one network element data record based on the executing, the at least one network element data record comprising at least one network performance metric statistic determined based on traffic link data associated with the at least one network element data record;

access the at least one network performance metric statistic from the at least one network element data record;

compare at least one network performance metric statistic with at least one threshold to detect at least one threshold violation;

identify at least one violating network element associated with the at least one threshold violation; and generate the requested network report comprising a correlated listing of the at least one extracted network address and the at least one network element data record, wherein the at least one violating network element is identified using at least one visual cue.

* * * * *